3,103,470
PROCESS FOR RECOVERING DRY METHANOL IN THE MANUFACTURE OF DIMETHYL TEREPHTHALATE
Carl L. Wilson and Joseph A. Moriarty, Kingsport, Tenn., assignors to Eastman Kodak Company, Rochester, N.Y., a corporation of New Jersey
Filed Jan. 21, 1960, Ser. No. 3,795
1 Claim. (Cl. 202—42)

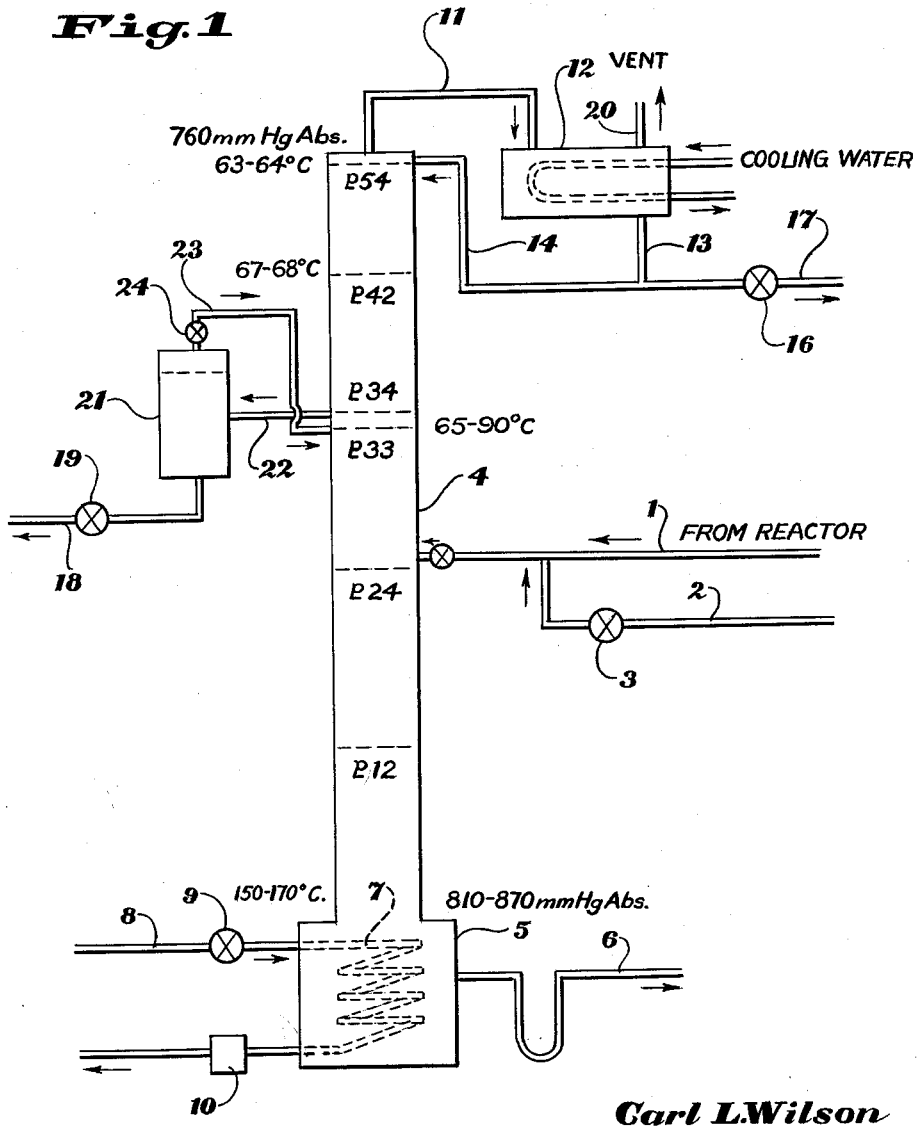

This invention relates to the simultaneous recovery of dry methanol and removal of water from reaction mixtures resulting from the esterification of terephthalic acid (TPA) with methanol to form dimethyl terephthalate (DMT). When terephthalic acid is esterified with methanol a large excess of methanol is used to obtain a high degree of conversion. This excess must be separated from DMT as a step in the purification, and in order to make the process economical the recovered methanol must be recycled. Before recycling, the methanol must be freed from the considerable quantities of water formed in the esterification reaction. Water must also be removed from the DMT formed. The contact time between the water and the DMT should be as short as possible, so that hydrolysis of DMT to monoester and/or TPA will be held to a minimum.

If reaction product from the esterification reactor were fed alone into a distillation column at atmospheric pressure and the methanol taken off at the top, with water and DMT going to the base, the DMT would freeze (M.P. 141.6° C.), because water and DMT are mutually insoluble, and the water would boil at only 100° C. The frozen DMT would foul the heat transfer surface, and complicate overflow and level control, etc. If the still is operated under pressure, so that the water boils above the melting point of DMT, considerable DMT is hydrolyzed back to monoester and/or TPA in the base heater. When this was done, with the base operated at 140–150° C. and the top of the column pressurized at 40–45 p.s.i.g., acidity in the base rose to about 15% calculated as TPA.

It is known to use xylene as a solvent which will boil in the base heater at a temperature slightly above the freezing point of DMT, and as a water-entrainer. However, in the prior art, water distilled off at the top of the column together with the methanol, and the methanol-water mixture had to be fractionally distilled in a separate operation in order to free the methanol from water before recycling it to the reactor. This added considerable expense and inconvenience to the process.

We have invented a process of simultaneously, in a single distillation, recovering dry methanol and removing water from the reaction mixture resulting from the formation of dimethyl terephthalate by the esterification of terephthalic acid with methanol. The method of operation of our invention may be described as follows, FIGURE I being a schematic diagram of the set-up.

Reaction mixture from the esterification reactor flows into the fractionating column 4 through pipe 1, at a point about half way up the column. A mixture of commercially avlaiable xylenes (ortho, meta and para) in an amount considerably greater than that required to form an azeotrope with the water of reaction, is fed through pipe 2, through some suitable metering or throttling device, such as valve 3, into pipe 1 before it enters the column. Dimethyl terephthalate (DMT), together with monomethyl terephthalate (monoester), terephthalic acid (TPA) and some of the various other impurities, being less volatile than other components of the reaction mixture, flow downward through the fractionating column 4 and collect in the base heater 5. Level is maintained in the base by gravity overflow through pipe 6, fitted with a suitable vapor sealing leg. Heat for the necessary boil-up is supplied through coil 7 into which is introduced saturated steam at pressures of 100–400 p.s.i.g., from steam supply header 8, through a suitable regulator 9. Condensate trap 10 is conventional equipment. Methanol, the azeotrope of xylene and water, and excess xylene rise through the column. Methanol, with a boiling point of 64.7° C., is the lowest-boiling component. Methanol vapor rises to the top of the column and passes through vapor line 11 at the top of the column to surface condenser 12 where the vapors are condensed and drain through pipe 13. Part of this stream is returned to the top of the column through reflux line 14 to furnish reflux for fractionation. The remainder is withdrawn through a suitable flow regulator, such as valve 16, and out pipe 17 to be recycled to the reactor. This stream contains substantially water-free methanol, some xylene, and possibly low-boiling compounds which can be recycled, without loss or damage to yield or quality of the product. The next most volatile material is the minimum-boiling-point azeotropic mixture, xylene-water, which boils at about 92° C. at 760 mm. Hg absolute pressure. The exact boiling point depends on the exact ratio of xylene isomers. A stream containing water, methanol and xylene is taken off from the column as a sidestream above the point of entry of the feed, and circulated through line 22 to decanter 21. The xylene-rich top layer from the decanter is returned to the column through flow regulating device 24 and return line 23 to a level slightly below that at which it was taken off. From the decanter, the water-rich bottom layer, which contains most of the water and some methanol but very little xylene, is continuously withdrawn through regulating device 19 and line 18, and is separated into its components in another distillation column. However, the flow through line 18 is small compared to that through line 17, so that comparatively little methanol has to be redistilled. The whole still is vented to the atmosphere through vent line 20 and suitable scavenger condensers, flame arresters, etc. The pressure in the base heater is greater than atmospheric only by the amount needed to overcome the inherent operating resistance of the distillation column. It may suitably be 810–870 mm. Hg absolute. Typical temperatures in a 54-plate bubble-cap column are 63–64° C. on the 54th (top) plate, 67–68° C. on the 42nd plate, 65–90° C. on the 33rd plate, and 150–170° C. in the base heater.

To illustrate the results obtained in the operation of our process, we give the following example.

*Example.*—148 pounds per hour of feed containing 3.2% water, 15.4% DMT, 0.3% acidity as TPA, 58.5% methanol, and 22.6% xylene was fed to the 24th plate (counting up from the base) of a 54-plate bubble-cap column through feed line 1, at the boiling point of the mixture. The crude DMT-xylene solution from the base, containing 1.2% acidity as TPA, 51.7% DMT, 0.1% water, and 47.0% xylene overflowed at a rate of 44 pounds per hour. 180–200 pounds per hour was refluxed. 92 pounds per hour of distillate containing 0.3% water, 10.3% xylene, 2.6% methyl acetate and 86.8% methanol was taken off the top of the column and reused for subsequent esterifications. 63 pounds per hour of reflux was taken off at plate 34 and circulated to the decanter 24. 11 pounds per hour of water-rich (lower) layer was removed from the decanter 24 through line 18. This layer contained 39.2% water, 58.3% methanol, and 2.6% xylene. The upper layer from the decanter was returned to the column on plate 33.

The amounts in pounds per hour were:

| | |
|---|---|
| Feed | 148 |

| | |
|---|---|
| Water | 4.736 |
| DMT | 22.792 |
| TPA | .444 |
| MeOH | 86.48 |
| Xylene | 33.448 |

| | |
|---|---|
| Base overflow | 44 |

| | |
|---|---|
| Water | .044 |
| DMT | 22.748 |
| TPA | .528 |
| Xylene | 20.68 |

| | |
|---|---|
| Overhead | 92 |

| | |
|---|---|
| Water | .276 |
| MeOH | 79.856 |
| Xylene | 9.476 |
| MeOAc | 2.392 |

| | |
|---|---|
| Side Stream | 11 |

| | |
|---|---|
| Water | 4.312 |
| MeOH | 6.413 |
| Xylene | .286 |

Temperatures during operation were:

| | Low, °C. | High, °C. | Avg., °C. |
|---|---|---|---|
| 54th plate (top) | 62 | 64 | 63.4 |
| 42nd plate | 66 | 72 | 67.4 |
| 33rd plate | 64 | 93 | 74.7 |
| Base heater liquid | 150 | 172 | 167.7 |

Pressure at the top of the column was atmospheric. Pressure at the base heater (vapor) was 1-2 p.s.i.g.

The temperature of the liquid in the base heater must be above the solution temperature of the DMT-xylene mixture to prevent freezing out of the DMT on the heater surface and plugging of the overflow line, etc. It should preferably be above 141.6° C., the melting point of DMT. Some solids, such as mineral impurities, will always be present, and TPA may precipitate to some extent, but small amounts of solids do not prevent successful operation of the column.

The equipment itself is all conventional. Any means of control of streams, pressures, or temperatures could be used. Any type of distillation column could be used, including bubble-cap plate, sieve plate, packed, etc. A level controller or any other method familiar to the art can be used to allow the liquid to overflow from the base heater. The exact method is not a part of this invention. Varying the height of the column and the location of the feed and sidestream takeoff are problems which can be readily solved by one skilled in the art.

Our process functions with xylene because the boiling point of xylene is greater than the boiling point of either water or the xylene-water azeotrope. So excess xylene flows to the base heater. There, the xylene furnishes the necessary boil-up to operate the column with moderate temperatures in the base (150-160° C.). At the same time, the boiling point of the base heater mixture is above the melting point of DMT so that DMT does not settle out in the base, fouling heat exchange surfaces and preventing overflow.

We claim:

A process performed in a single distillation column equipped with a base heater, whereby substantially dry methanol and dimethyl terephthalate are simultaneously separated from the reaction mixture resulting from the formation of dimethyl terephthalate by the esterification of terephthalic acid with methanol, which process comprises:

(1) introducing into the middle portion of said column a feed composed of said reaction mixture and an amount of xylene considerably greater than that required to form an azeotrope with the water present in said reaction mixture, said feed consisting essentially of methanol, dimethyl terephthalate, water, volatile impurities and xylene, (2) distilling off, at the top of said column, substantially dry methanol containing some xylene and volatile impurities, while maintaining the temperature at said top at about 62° to 64° C. at about atmospheric pressure, (3) overflowing from said base a solution of dimethyl terephthalate in xylene substantially free from water, while maintaining the temperature of said base heater within the range of approximately 150° to 170° C., and (4) taking off, at a point intermediate said feed and said top of the column, a side stream which is separated by gravity into an upper portion and a lower portion, said upper portion being essentially composed of xylene which is returned to said column at about the same point where said side stream is taken off, and said lower portion being essentially composed of most of the water from said feed together with a minor proportion of the methanol from the feed and some xylene.

References Cited in the file of this patent

UNITED STATES PATENTS

| | | |
|---|---|---|
| 2,480,347 | Witcoff | Aug. 30, 1949 |
| 2,549,290 | Congdon et al. | Apr. 17, 1951 |
| 2,638,440 | Drout et al. | May 12, 1953 |
| 2,683,110 | Rousseau | July 6, 1954 |
| 2,698,286 | Bircher | Dec. 28, 1954 |
| 2,729,600 | Beach | Jan. 3, 1956 |
| 2,795,537 | Kemp et al. | June 11, 1957 |
| 2,894,021 | Siggel et al. | July 7, 1959 |
| 2,901,405 | Venis | Aug. 25, 1959 |
| 2,992,168 | Wilson et al. | July 11, 1961 |
| 3,006,817 | Ney et al. | Oct. 31, 1961 |

FOREIGN PATENTS

| | | |
|---|---|---|
| 551,366 | Belgium | Oct. 15, 1956 |